US011194910B2

(12) United States Patent
Mazumder et al.

(10) Patent No.: US 11,194,910 B2
(45) Date of Patent: Dec. 7, 2021

(54) INTELLIGENT SYSTEM FOR DETECTING MULTISTAGE ATTACKS

(71) Applicant: Microsoft Technology Licensing, LLC, Redmond, WA (US)

(72) Inventors: Anisha Mazumder, Bellevue, WA (US); Craig Henry Wittenberg, Clyde Hill, WA (US); Daniel L. Mace, Bellevue, WA (US); Haijun Zhai, Bothell, WA (US); Seetharaman Harikrishnan, Clyde Hill, WA (US); Ram Shankar Siva Kumar, Bothell, WA (US); Yogesh K. Roy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 238 days.

(21) Appl. No.: 16/179,573

(22) Filed: Nov. 2, 2018

(65) Prior Publication Data
US 2020/0143052 A1    May 7, 2020

(51) Int. Cl.
*H04L 29/06* (2006.01)
*G06F 21/56* (2013.01)
*G06N 5/04* (2006.01)
*G06N 7/08* (2006.01)
*G06N 7/00* (2006.01)

(52) U.S. Cl.
CPC ...... *G06F 21/566* (2013.01); *G06F 2221/034* (2013.01); *G06N 5/04* (2013.01); *G06N 7/005* (2013.01); *G06N 7/08* (2013.01)

(58) Field of Classification Search
CPC ............ G06F 21/566; G06F 2221/034; G06F 21/552; G06N 5/04; G06N 7/08; G06N 7/005
See application file for complete search history.

(56) References Cited

U.S. PATENT DOCUMENTS 10,015,183 B1 * 7/2018 Neil ..................... G06N 5/045
10,503,844 B1 * 12/2019 Li ........................... G06F 30/20
(Continued)

OTHER PUBLICATIONS

Ioannou et al. A Markov Multi-Phase Transferable Belief Model; 16th International Conference on Information Fusion Istanbul, Turkey, Jul. 9-12, 2013 (Year: 2013).*

*Primary Examiner* — Taghi T Arani
*Assistant Examiner* — Lin Chang
(74) *Attorney, Agent, or Firm* — Workman Nydegger

(57) ABSTRACT

Provided herein are methods, systems, and computer program products for intelligent detection of multistage attacks which may arise in computer environments. Embodiments herein leverage adaptive graph-based machine-learning solutions that can incorporate rules as well as supervised learning for detecting multistage attacks. Multistage attacks and attack chains may be detected or identified by collecting data representing events, detections, and behaviors, determining relationships among various data, and analyzing the data and associated relationships. A graph of events, detections, and behaviors which are connected by edges representing relationships between nodes of the graph may be constructed and then subgraphs of the possibly enormous initial graph may be identified which represent likely attacks.

20 Claims, 3 Drawing Sheets

(56) References Cited

U.S. PATENT DOCUMENTS

| | | | |
|---|---|---|---|
| 2007/0209074 A1* | 9/2007 | Coffman | H04L 63/145 726/23 |
| 2016/0371489 A1* | 12/2016 | Puri | G06F 16/254 |
| 2018/0032724 A1* | 2/2018 | Tang | H04L 63/1425 |
| 2018/0103052 A1* | 4/2018 | Choudhury | H04L 63/1416 |
| 2018/0219888 A1* | 8/2018 | Apostolopoulos | H04L 63/1425 |
| 2018/0316704 A1* | 11/2018 | Joseph Durairaj | G06N 5/022 |
| 2019/0141058 A1* | 5/2019 | Hassanzadeh | H04L 63/0227 |
| 2019/0342195 A1* | 11/2019 | Mermoud | G06F 40/20 |
| 2019/0342307 A1* | 11/2019 | Gamble | H04L 63/1416 |
| 2020/0228558 A1* | 7/2020 | Apostolopoulos | G06F 16/9024 |

\* cited by examiner

INTELLIGENT SYSTEM FOR DETECTING MULTISTAGE ATTACKS

BACKGROUND

Computers and corresponding software applications are becoming increasingly sophisticated, enabling users to store, access and manipulate data in a variety of ways. Computers and computing systems have affected nearly every aspect of modern living. Computers are generally involved in industry, finance, work, recreation, healthcare, transportation, entertainment, household management, etc. For instance, computer applications can be used to perform word processing, graphic design, audio/visual processing, data analytics, electronic communications, accounting, scheduling, resource management, and much more.

Computer functionality can be facilitated and enhanced by a computing system's ability to be interconnected to other computing systems via network connections. Network connections may include, but are not limited to, connections via the Internet, wired or wireless Ethernet, cellular connections, computer to computer connections through serial, parallel, USB, or other physical connections, as well as many others. The connections allow a client, a user, a computing system to access services at other computing systems and to quickly and efficiently access computer resources and data from other computing systems.

Interconnection of computing systems has facilitated distributed computing systems, such as so-called "cloud" computing systems. Cloud computing may include systems or resources for enabling ubiquitous, convenient, on-demand network access to a pool of configurable computing resources (e.g., networks, servers, storage, applications, services, etc.) that may be accessible to multiple users or clients and can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud, network, and remote based services, resources, and applications are ubiquitous. Such applications are hosted on public and private remote and network accessible systems such as clouds and often offer a set of network-based services for access to resources and communicating back and forth with systems, users, and clients.

Unfortunately, the Internet, cloud, and other interconnection of computing systems exposes computing systems to vulnerabilities and threats from malicious parties. For instance, a malicious party may fraudulently gain access to a protected and/or sensitive computer resource. A malicious party may download or copy data to which he does not have proper credentials to access. A malicious party might fraudulently alter data that he is not allowed to access, edit, or change. A malicious party may access and control industrial processes. A malicious party may access and control computer-operated physical access to physical locations. A malicious party may transmit malware code to an unsuspecting computing system or create applications that are knowingly executed by the computer system but which contain hidden malware that performs undesired actions on the computing system. It is also possible for a malicious party to initiate a brute force attack or DDoS (distributed denial-of-service) attack on a computing system. In short, anything that is controlled by, used by, stored by, or protected by a computer system may be vulnerable to a malicious actor.

There are many types of malicious behavior and attacks which must be defended against. There may be active or passive attacks. An attack may be an inside or an outside attack. Attacks may include denial-of-service (DoS) attacks, man in the middle attacks, phishing and spear phishing, spoofing, keystroke logging, backdoor attacks, wiretapping and network sniffing, drive by attacks, password attacks (including guessing, brute force, and theft), database or SQL injection attacks, cross-site scripting attacks, eavesdropping attacks, birthday attacks, malware attacks, etc. In order to defend against attacks, fraudulent access, etc., online systems, database stores, data warehouses, computer operators, computer systems, IT professions, private and commercial entities, etc., must be able to recognize a possible attack or fraudulent access.

Computer systems and resources which need to be protected may be physical, virtual, or logical. Generally, a computer resource may have one or more vulnerabilities which might be exploited by a malicious actor or threat agent in an attack. For example, an online banking system may use a userID/password pair to allow a client to access financial information and/or withdraw or transfer money. Guessing or stealing the userID/password pair would be a vulnerability which a malicious actor might exploit to steal money from an account. As attacks may originate from myriad different origination points and take myriad different forms, recognizing possible attacks is a gargantuan problem.

In many cases, an attacker may take a series of steps to effect an attack, arrive at destination, access or otherwise compromise a computer resource, etc. A series of such steps is sometimes referred to as an attack chain or a kill chain.

Accordingly, there is an ongoing need and desire for new and improved ways to identify attacks and threats and identify threat scenarios, including new and possibly unknown attacks and threat scenarios.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Provided herein are methods, systems, and computer program products for detecting multistage attacks which may arise in computer environments. Also provided are method and systems for recognizing, detecting, and identifying possible attack chains.

It may be noted that prior systems which observed and recorded detections focused on individual services can miss many attacks. Advanced adversaries can often engineer complicated multistate attacks. Embodiments herein leverage adaptive graph-based machine-learning solutions that can incorporate rules as well as supervised learning for detecting multistage attacks. Multistage attacks and attack chains may be detected or identified by collecting data representing events, detections, and behaviors, determining relationships among various data, and analyzing the data and associated relationships. A graph of events, detections, and behaviors which are connected by edges representing relationships between nodes of the graph may be constructed and then subgraphs of the (possibly enormous) graph may be identified which represent likely attacks.

For instance, a method may be provided for detecting a multistage attack. The multistage attack may comprise a series of steps or events which may comprise an attack chain. The method for detecting a multistage attack may include accessing a collection of data associated with one or more computer resources and utilization. A graph may be constructed using the collected data. Nodes of the graph may be items within the collection of data and edges connecting the nodes of the graph may be relationships between the connected nodes. Possible attack subgraphs may be identified within the constructed graph where the identified attack subgraphs are subgraphs of the constructed graph. The identified possible attack subgraphs may be filtered to determine a set of domain specific subgraphs. The domain specific subgraphs may be ranked based on at least one of connectivity and relevance. One or more of the domain specific subgraphs may be identified with a score above a particular threshold indicating a likelihood of an actual attack.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
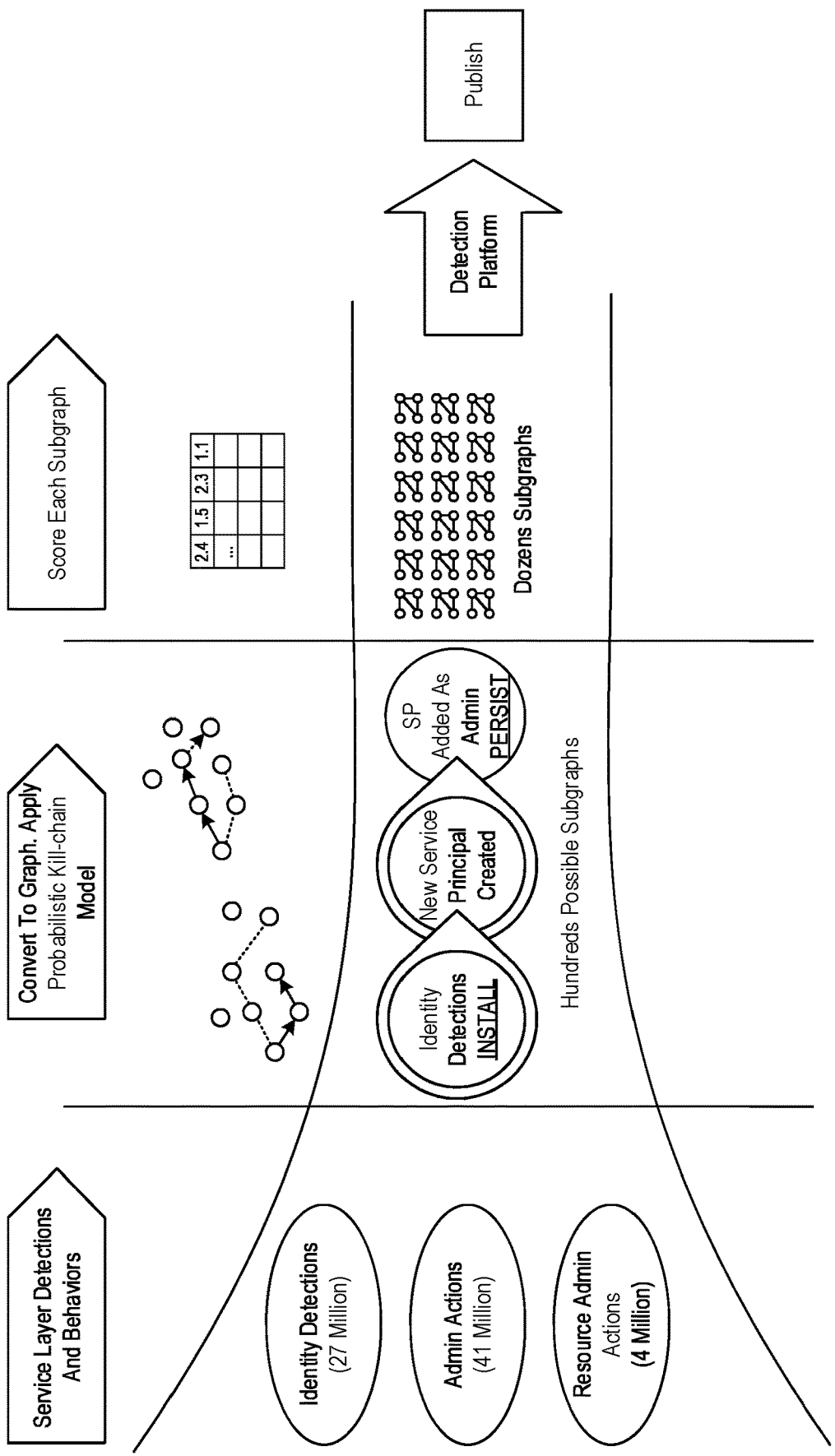
FIG. 1 illustrates an example pipeline for detecting multistage attacks.

Provided herein are methods, systems, and computer program products for detecting multistage attacks which may arise in computer environments. Also provided are method and systems for recognizing, detecting, and identifying possible attack chains which may be present or arise in complex cross service networks of interconnected systems.

It may be noted that prior systems which observed and recorded detections focused on individual services can miss many attacks. Advanced adversaries can often engineer complicated multistate attacks. Embodiments herein leverage adaptive graph-based machine-learning solutions that can incorporate rules as well as supervised/unsupervised learning for detecting multistage attacks. Multistage attacks and attack chains may be detected or identified by collecting data representing events, detections, and behaviors, determining relationships among various data, and analyzing the data and associated relationships. A graph of events, detections, and behaviors which are connected by edges representing relationships between nodes of the graph may be constructed and then subgraphs of the (possibly enormous) graph may be identified which represent likely attacks.

In one embodiment, a method may be provided for detecting a multistage attack. The multistage attack may comprise a series of steps or events which may comprise an attack chain. The method or detecting multistage attacks may include accessing a collection of data associated with one or more computer resources and utilization. A graph may be constructed using the collected data. Nodes of the graph may be items within the collection of data and edges connecting the nodes of the graph may be relationships between the connected nodes. Possible attack subgraphs may be identified within the constructed graph where the identified attack subgraphs are subgraphs of the constructed graph. The identified possible attack subgraphs may be filtered to determine a set of domain specific subgraphs. The domain specific subgraphs may be ranked based on at least one of connectivity and relevance. One or more of the domain specific subgraphs may be identified with a score above a particular threshold indicating a likelihood of an actual attack.

An attack chain, sometimes also called a kill chain, generally comprises a series of steps a malicious actor or an attacker may use to access a target. For example, a malicious actor may perform research to identify and select a possible target. Additional research may be employed to determine a method of access to the target. Such access might be determining a userID/password pair for an authorized user, may be delivering malware to a target host, may be opening a backdoor access to a protected resource, or myriad other methods. A userID/password pair may be used to directly access a target. Malware, once delivered, may be triggered or executed to open a back door allowing access to a target or to, itself, perform malicious operations on the target. In another case, malware may access a target and deliver a protected resource from within a security boundary to an outside unauthorized actor. In any event, gaining access to a target or exploiting a vulnerability can often take many steps in order to identify and then exploit a target or resource. The multiple steps in exploiting a target may also have relationships which link certain steps, events, behaviors, etc., to each other. Identification of the events and relationships can be utilized in certain embodiments for detecting possible attack chains.

The methods, systems, and computer program products presented herein take in a volume and variety of data. A graph may be built from the accessed data. The graph might include identities (e.g., userIDs, directory), document addresses, IP addresses, device identifications and locations (user or destination), resource identifications and locations, etc. Events, detections, resources, users, etc., may become nodes in the graph. The nodes of the graph may be connected by edges which represent relationships between the nodes of the graph. For instance, a user might be connected with an authentication directory in which the user is listed and the user may also be connected to a resource, such as a protected data file, to which the user has authorized access. The "member of" the authentication directory and the "access to" are examples of relationships which form the edges of the graph.

An intelligent system can take the graph, which may be enormous, and use machine learning to analyze and deconstruct the graph in an intelligent way that identifies subgraphs which indicate the possibility of an attacker's intents. An identified subgraph, for instance, may be identified as comprising some or all of the attack chain or kill chain steps which may be necessary for an attacker to reach an objective. Such a series of steps may have time constraints, relationships, that would resemble an attacker's behavior. For example, discovering a resource, finding an account that has authorized access to the resource, determining credentials which can be used to access account may be discovery steps included in an attack chain, and the timing and ordering between these events would be consistent with an attack.

An attack chain or a kill chain may include some or all of the steps necessary for attacker to reach objective. For example, an attacker may find that a target document exists, find where the document is stored, find an account with access to the document, find credentials to access the account, login as the account holder, and access the document. Discovery is a broad concept which generally refers to a malicious actor determining who or what the attacker may want to go after. Discovery might be random access to a blog where an attacker sees "Hey, here is Joe Smith's email address" and then uses that as a seed to build a kill chain leading to some resource associated with Joe Smith. These steps can often go unseen from an analyst/algorithms perspective, but there is a strong enough probability that this may be a malicious kill chain and an attack is occurring or about to occur.

All such potentially correlated data may be observed, taken in, and recorded. The data may be standardized so all can be composed in a common graph. This may, in many cases, be massive amount of data—millions & millions of events, detections, & behaviors observed.

A pipeline may be built using probabilistic models. FIG. 1, for instance, illustrates such a pipeline. Detections and behaviors are observed, collected, and converted to a graph. The initial graph may have millions of input data points and millions of nodes and edges connecting the nodes.

For instance, there may be millions of service layer detections, observed events and behaviors. This may include millions of detections of identities or assets (also referred to as entities). Those entities may be user identities, services, client resources, resource identities, client identities, service identities, etc. There may also be millions of observed administrative actions and high privileges behaviors. Such actions may include adding users to an authentication directory, changing userIDs or passwords, changing the access privileges to resources, etc. There may also be millions of administrative resource actions. Such administrative resource actions may be adding a resource to a resource manager, changing access policies associated with the resource, etc.

As also illustrated in FIG. 1, the events, detections, and behaviors may be converted to a graph. (This graph may be very large with millions of nodes and edges.) The nodes of the constructed graph may represent the events, detections, and behaviors as well as known resources and targets. The edges in the constructed graph will be relationships between all of the nodes of the graph.

A probabilistic kill-chain model may be applied to the resulting graph. Millions or even 100's of millions of nodes, edges, and subgraphs may be substantially reduced to a much smaller set of possible attack subgraphs by using intelligent probabilistic systems to infer attacker motives and patterns. (An attack subgraph may represent a possible attack chain or kill chain.) In an example, the large graph may be reduced to hundreds of possible attack subgraphs. This reduced set of possible attack subgraphs may be further reduced by using filtering or other supervised/semi-supervised approaches to limit the possible attack subgraphs. The reduced set of domain-specific subgraphs may be further reduced to dozens of scored subgraphs. The reduced set of scored subgraphs may be ranked according to connectivity, relevance, or other intelligent system. Ranking the subgraphs may produce a score which indicates a likelihood of a particular subgraph representing an actual attack. Subgraphs which have a score above a particular score may be reported or published to administrators, users, or security systems.

Figure 2:
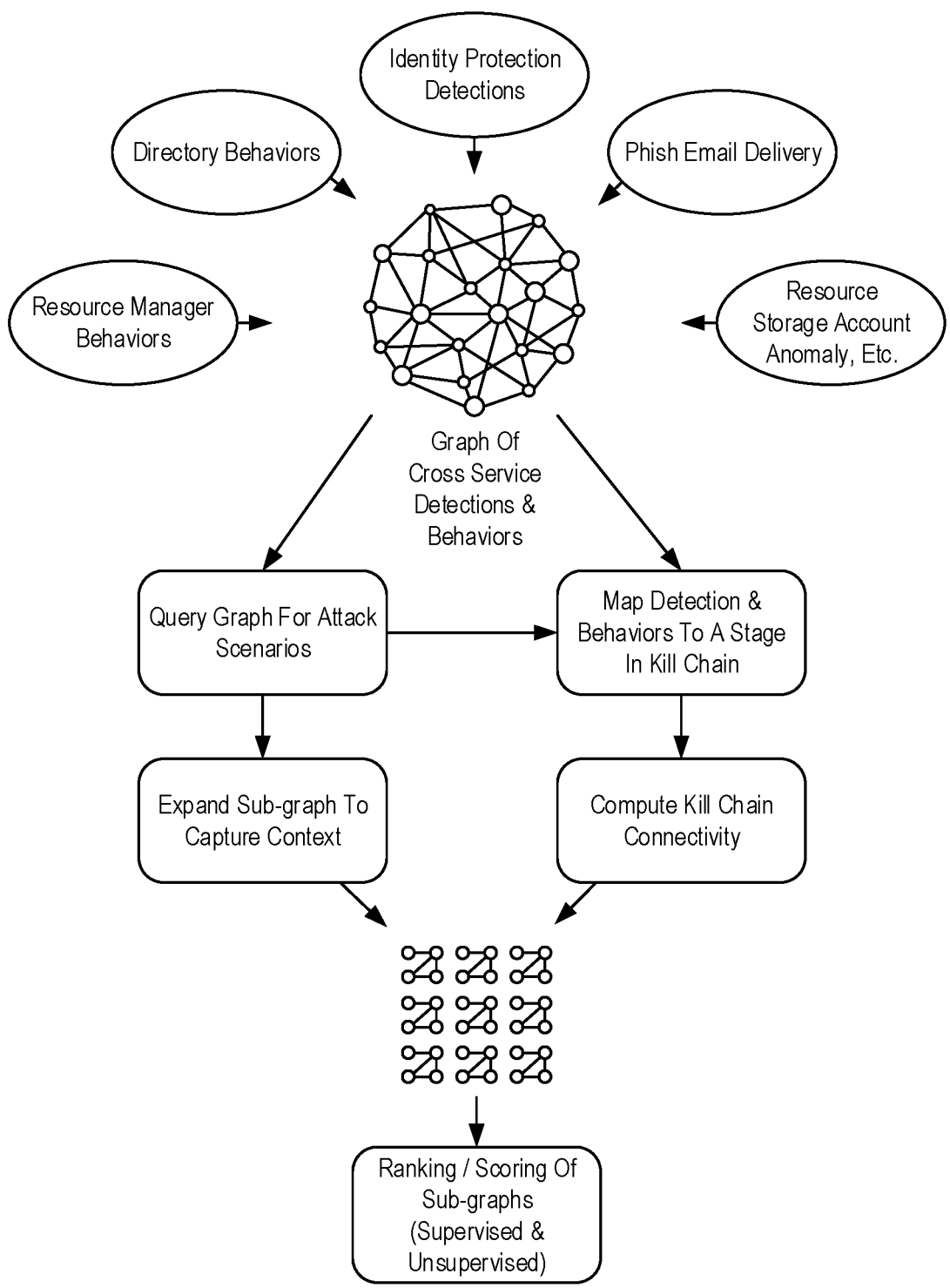
FIG. 2 illustrates inputs to a graph and analysis of a graph during the ranking and scoring of subgraphs.

As illustrated in FIG. 2, a great many data points and items may be accessed and included in constructing a graph. The data may include resource manager behaviors such as adding a resource, changing privileges on a resource, adding an authorized user to a resource, etc. The data may include directory behaviors. Directories may include data including identification of users, passwords, and access privileges and credentials. Directory behaviors may include accessing or modifying directory information, changing directory permissions, or modifying directory authentication methods. The data may also include detections of identity protections and use of identities and credentials for resource access or use. Data may also include email deliveries including possibly fraudulent email (such as phishing or spear phishing). Data may also include resource accesses and/or anomalies associated with resource storage and access. A (possibly large) graph may be constructed with all the collected data connecting each node with an edge which represents a relationship between pairs of nodes.

The large graph may then be analyzed and manipulated to produce a smaller set of subgraphs. Probabilistic models may be used to query the graph for possible attack scenarios. This may be done by mapping a subgraph to an attack chain and determining a probability that a subgraph may be part of or associated with a given attack chain. A suspicious subgraph may be expanded to capture the context of the subgraph and, when the context indicates a high probability with particular vulnerable resources, it can be included in a set of "interesting" subgraphs for further analysis and processing. The reduced set of subgraphs may then be scored and ranked to determine a small set of subgraphs that represent a high likelihood of representing an actual attack.

By building a graph, the graph may be used to detect vulnerabilities and/or possible future attacks. The graph may also be used to detect past, current, or future attack-like behavior.

The events, detections, and behaviors which are used to build the graph may in some cases represent high impact events or activities. High impact activities may include, for example, changing permissions on a resource, adding a permitted user to a resource, changing authentication credentials for a user or resource, etc. High impact activities, in and of themselves, might not necessarily be a sign of an attack. However, coupled with other suspicious behavior, an activity or event or series of activities and/or events may be indicative of an attack. For instance, a user logging in at odd time of day, changing permissions, moving resources, logging in from an odd location or an odd IP address may be suspicious and indicative of a possible attack.

Correlation engines may be used to analyze and evaluate a graph of nodes and relationships. Correlation engines may be a reasonable first step but they have limitations. Correlation engines may not improve signal quality or reduce the size of the initial graph nearly as well as the graph-based approaches disclosed herein. The graph-based approaches disclosed herein provide for orders of magnitude better reduction of the large body of data to a smaller and more manageable set of subgraphs indicative of suspicious behaviors. Expert knowledge may be incorporated into the systems and methods to improve results. Expert systems and machine learning may be applied to the analysis of the graphs to identify subgraphs within the graph which may have a likelihood of being associated with an attack chain, kill chain, or other malicious or suspicious behavior.

Feedback may also be used to improve results of the system. As subgraphs are identified as suspicious or possible attack chains, feedback to the system may be provided to confirm or deny the accuracy of the identification. Such feedback, over time, may be used to improve the accuracy of the intelligent system evaluating graphs and subgraphs for a likelihood of being an attack chain or portion of an attack chain. Elements, events, and observations can be re-escalated or re-prioritized using such feedback. Feedback may be used to indicate as benign a subgraph which had been identified as suspicious and may be used to indicate as likely malicious a subgraph initially determined to be benign.

Such feedback may employ supervised learning/semi-supervised learning, or reinforcement/active learning. Supervised learning may take input data, such as a particular subgraph, convert that data to numerical or categorical data, and build decision trees using feedback and produce yes/no or 0/1 decision trees. The supervised learning may take the particular subgraph and determine how long, in terms of steps in the graph, it would take to walk from a particular event or detection to a vulnerable resource. The supervised learning may take input from users and clients as to which nodes or resources may be "interesting" and how much weight should be given to a particular path in the subgraph from an event or detection to an interesting, valuable, or sensitive resource. Semi-supervised, reinforcement learning and active learning can also be used where the need for additional feedback is large and automated/semi-automated processes are needed for improvement.

An initial step may include building an initial graph. A set of raw events is accessed and converted to a universal data set. A graph is then built with edges which conform to a kill chain schema. A probabilistic kill chain representation may then be run using, in one embodiment, an Markov chain Monte Carlo (MCMC). This allows the (probably large) graph to be separated into smaller subgraphs. This is a probabilistic model that allows a graph to be separated, perform limited runs of Markov chain Monte Carlo methods as a stochastic process. One may start with an individual node and use a probability model to connect nodes in the graph, It may then be determined what it would take to walk to another node within the graph. All nodes can be connected which, according to the probabilistic kill chain model, "make sense" in that they fall within a particular probability. Other nodes that fall outside of the particular probability can be filtered out. Multiple (but limited) runs may be made across the whole graph. This process will take a massively connected graph and split it into multiple subgraphs. The multiple subgraphs, based on the way the large graph has been separated, may then be analyzed to determine how easy is it to get to high impact activities from within the individual subgraphs. A subgraph may score higher if it is easy to get to a sensitive resource (or node) from within the subgraph and may score lower if it is more difficult to reach a sensitive resource.

For instance, state sponsored actors may score higher in a probabilistic model because it's easier to reach high impact activity from a subgraph comprising an event associated with the state sponsored actor. Further, a state sponsored actor (or other de facto suspicious actor or event) may be associated with other suspicious activities and, because of relationships (edges) connecting those nodes in the graph will result in a subgraph of high probability of association with an attack.

In some embodiments, a spectral decomposition may be performed on an individual graph to break it down to further individual subgraphs. Those further subgraphs may then be analyzed probabilistically to determine whether they look like graphs representing other, known scenarios. If so, a subgraph will rank higher if it is probabilistically similar to a known malicious scenario. Further, when it easy to reach important nodes or to reach high impact activities, then a subgraph will score higher. A combination of scores for weighted activities may then be used for a final score of a particular subgraph.

Scores can be adjusted manually/semi-manually, or through domain knowledge and feedback including supervised learning algorithms. Administrators can periodically adjust scores for particular subgraphs and known scenarios. This feedback to the system can improve the accuracy of the system over time and can weight (emphasize or deemphasize) particular scenarios which a particular user or entity may be especially interested in. This feedback may also provide a manual confirmation (or non-confirmation) that the system is providing accurate output.

The method may produce tabular output to a client, user, or customer. The tabular output may be stored in durable data storage and may be transmitted to a client, user, or customer. The tabular output may include particular subgraphs which include events, observations, and/or detections, the relationships between the events, observations, and/or detections, and a score indicating the likelihood that the events, observations, and/or detections are associated with an attack or malicious behavior.

(50:00) The methods and systems described herein may maintain very large graph-based datasets. Such large datasets may be maintained in the background. The methods and systems may continuously monitor events, detections. and observations over a wide variety of disparate systems and services and continuously or periodically add newly observed data to a graph. Further, new relationships and associations may provide for new edges to be added to a graph over time. The analysis of the graph may occur periodically or continuously to identify possible attacks or malicious behavior as it arises.

Embodiments herein include each of methods, systems, and computer program products for detecting multistage attacks. A method may be a series of steps or functions performed upon or within a computer system. A system may include computer processors and computer-executable instructions which, when executed upon the one or more processors, cause the system perform or to be enabled to perform a series of steps or functions. A computer program product may include a data storage device which has computer-executable instructions encoded thereon which, when executed upon one or more processors of a computer system, cause the system perform or to be enabled to perform a series of steps or functions.

Figure 3:
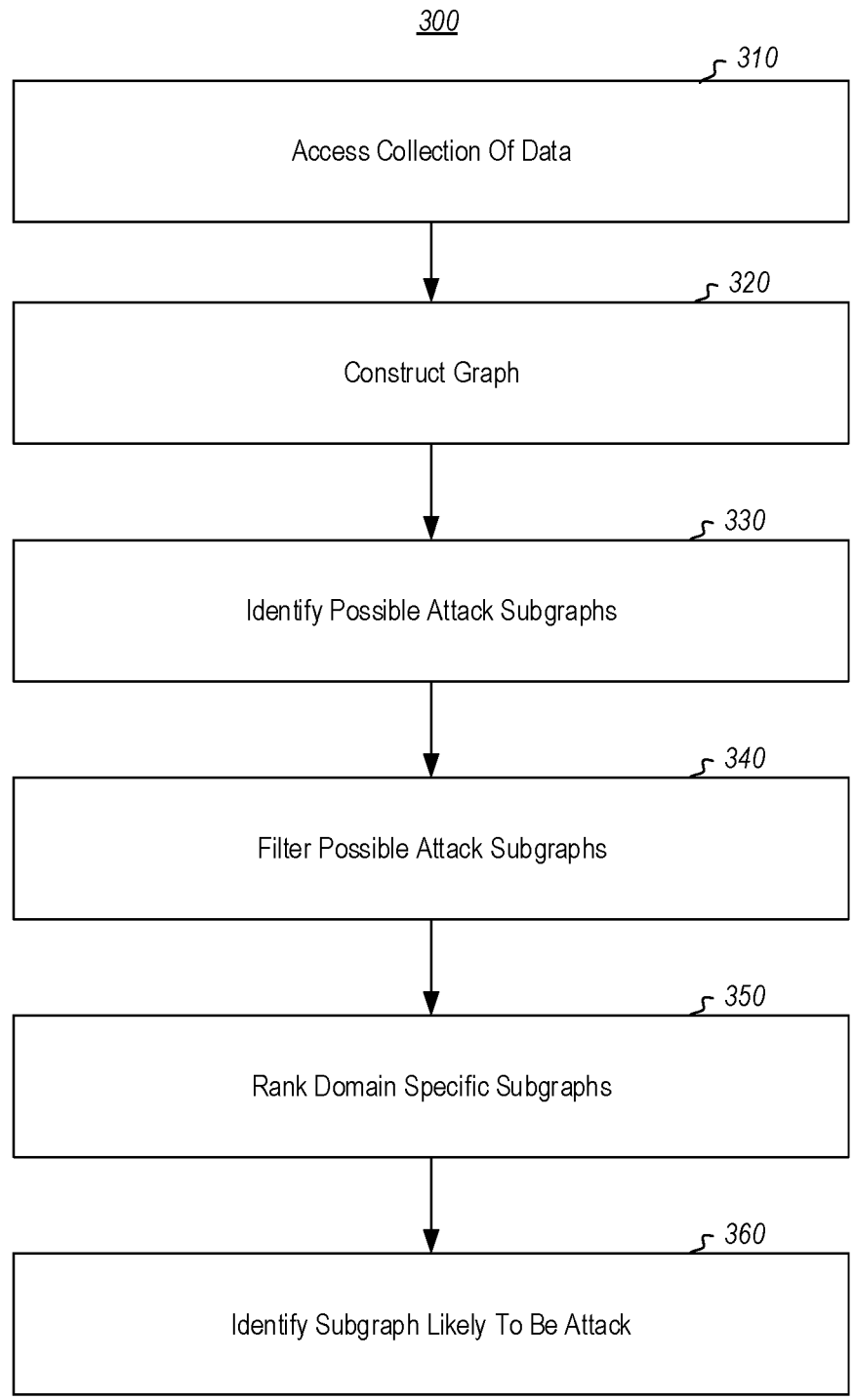
FIG. 3 illustrates an example method for graph-based detection of multistage attacks.

FIG. 3, for instance, illustrates a method 300 for detecting multistage attacks. Initially, the method includes accessing 310 a collection of data associated with one or more computer resources and utilization. The collection of data associated with computer resource protection and utilization may include alerts and detections spanning multiple services. The collection of data may include a plurality of events, detections, and/or behaviors. The collections of data may include events, detections, and behaviors. Such events, detections, and behaviors, for instance, may include a user login, a network access, changes to credentials, a user being added to an authentication directory, a change to access privileges, etc.

The method also includes constructing a graph 320. The graph is constructed using the collected data. Nodes of the graph may be items within the collection of data and edges connecting the nodes can be relationships between the connected nodes. Relationships may include one or more of shared resources, common entities, resource identities, IP addresses, geographic locations, or logical locations. Relationships may include an access privilege, a geographic, virtual, or logical location, time, etc. For example, a node may be a user login for User A. Another node may be Database B. User A may have access privileges to Database B. Because of this relationship, NodeA of a graph, representing User A, and Node B of the graph, representing Database B, may be connected by an edge which represents the relationship that User A has access privileges to Database B.

In another example, a set of users in a graph may all be connected by edges representing a common IP address subdomain. In this example, an attack may be identified by ordinarily non-suspicious activity being originated from an IP address which is associated with a previously known attack.

The method also includes identifying possible attack subgraphs 330 within the constructed graph. The identified attack subgraphs are subgraphs of the constructed graph. Identifying possible attack subgraphs may include applying a Bayesian Markov chain Monte Carlo method to the constructed graph. This may be done repeatedly in a stochastic process to reduce the (possibly large) graph to a limited set of possible attack subgraphs.

The method also includes filtering 340 the identified possible attack subgraphs to determine a set of domain specific subgraphs. Filtering the graph to determine a set of domain specific subgraphs may include applying a knowledge based system. A knowledge-based system may comprise information known about particular events, identities, resources, and relationships which can be applied to determine an association of a particular subgraph with a particular domain of interest. Filtering the identified possible attack subgraphs may include applying a probabilistic model to the graph and scoring a plurality of subgraphs of the graph.

The method also includes ranking 350 the domain specific subgraphs based on at least one of connectivity and relevance. The ranking may be refined or improved by applying feedback. Feedback may come from users or administrators to refine a rank based on known attack chains, known malicious actors, sensitivity of particular resources or targets, etc.

The method also includes identifying one or more of the domain specific subgraphs 360 with a score above a particular threshold indicating a likelihood of an actual attack. The identified one or more of the domain specific subgraphs with a score above a particular threshold indicating a likelihood of an actual attack may be output to durable storage or transmitted to a recipient. A user or subsequent system may then access the storage device or the recipient may then act upon the information contained in the output to protect the relevant resource against the actual attack.

It should be appreciated that the method as described herein may also be performed within or by a system comprising computer processors and access to data and can also be embodied in a computer program product which include computer executable instructions which, when executed within a system comprising computer processors, then performs the method(s).

It will be appreciated that the scope of this disclosure includes any combination of the foregoing embodiments. It will be appreciated, in view of the foregoing, that the current embodiments enable a computing system to more efficiently, than previous or existing techniques, determine possible threats to resources and/or target systems experiencing threat conditions, including new or possibly unknown threat conditions The disclosed methods may be practiced by various types of special purpose or general-purpose computing systems including computer hardware. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and computer-readable transmission media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer. As is well-known, computer-readable storage devices are physical articles of manufacture which can store data which is readable or otherwise accessible to computer systems.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically or otherwise from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in computing environments including network computing environments with many types of computer system configurations, including, distributed computing systems, cloud computing systems, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (by network data communication links, by hardwired data links, wireless data links, or by any combination of network, hardwired, or wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method for detecting multistage attacks, the method comprising:
   accessing a collection of data associated with one or more computer resources and utilization;
   constructing a graph using the collected data, nodes of the graph being items within the collection of data and edges connecting the nodes being relationships between the connected nodes;
   identifying possible attack subgraphs within the constructed graph by applying a probabilistic kill chain model, the identified attack subgraphs being subgraphs of the constructed graph, a kill chain comprising steps an attack uses to access a target;
   determining a score for each of the identified attack subgraphs, the score being a combination of scores for weighted activities and associated with a measure of a number of steps from the each subgraph to a particular activity or to a sensitive resource;
   filtering the identified possible attack subgraphs to determine a set of domain specific subgraphs;
   ranking the domain specific subgraphs based on at least one of connectivity and relevance;
   identifying one or more of the domain specific subgraphs where the determined score is above a particular threshold indicating a likelihood of an actual attack; and
   publishing the identified likely actual attack to an administrator, user, or security system.

2. The method of claim 1, further comprising refining the ranking by applying feedback.

3. The method of claim 1, wherein filtering the graph to determine the set of domain specific subgraphs comprises applying a knowledge based system.

4. The method of claim 1, wherein identifying possible attack subgraphs comprises applying a Bayesian Markov chain Monte Carlo method.

5. The method of claim 1, wherein the collection of data associated with computer resource protection and utilization comprises alerts and detections spanning multiple services.

6. The method of claim 1, wherein the collection of data comprises a plurality of events, detections, or behaviors.

7. The method of claim 1, wherein the relationships comprise one or more of shared resources, common entities, resource identities, IP addresses, geographic locations, or logical locations.

8. The method of claim 1, wherein filtering the identified possible attack subgraphs comprises applying a probabilistic model to the graph and scoring a plurality of subgraphs of the graph.

9. The method of claim 1, wherein the identified one or more of the domain specific subgraphs with the score above the particular threshold indicating a likelihood of an actual attack are output to a storage device or transmitted to a recipient.

10. The method of claim 1, wherein subgraph ranking includes spectral decomposition of subgraphs and ranking based on connectivity.

11. A system for detecting multistage attacks, the system comprising:
one or more computer processors; and one or more data storage devices having stored thereon computer-executable instructions which, when executed upon the one or more computer processors, enable the system to perform:
accessing a collection of data associated with one or more computer resources and utilization;
   constructing a graph using the collected data, nodes of the graph being items within the collection of data and edges connecting the nodes being relationships between the connected nodes;
   identifying possible attack subgraphs within the constructed graph by applying a probabilistic kill chain model, the identified attack subgraphs being subgraphs of the constructed graph, a kill chain comprising steps an attack uses to access a target;
   determining a score for each of the identified attack subgraphs, the score being a combination of scores for weighted activities and associated with a measure of a number of steps from the each subgraph to a particular activity or to a sensitive resource;
   filtering the identified possible attack subgraphs to determine a set of domain specific subgraphs;
   ranking the domain specific subgraphs based on at least one of connectivity and relevance;
   identifying one or more of the domain specific subgraphs where the determined score is above a particular threshold indicating a likelihood of an actual attack; and publishing the identified likely actual attack to an administrator, user, or security system.

12. The system of claim 11, wherein the system is further enabled to refine the ranking by applying feedback.

13. The system of claim 11, wherein identifying possible attack subgraphs comprises applying a Bayesian Markov chain Monte Carlo method.

14. The system of claim 11, wherein the system is further enabled to filtering the identified possible attack subgraphs comprises applying a probabilistic model to the graph and scoring a plurality of subgraphs of the graph.

15. The system of claim 11, wherein the system is further enabled to filtering the graph to determine a set of domain specific subgraphs comprises applying a knowledge based system.

16. A computer program product for detecting multistage attacks, the computer program product comprising one or more data storage devices having stored thereon computer-executable instructions which, when executed upon one or more computer processors of a computer system, enable the system to perform:
   accessing a collection of data associated with one or more computer resources and utilization;
   constructing a graph using the collected data, nodes of the graph being items within the collection of data and edges connecting the nodes being relationships between the connected nodes;
   identifying possible attack subgraphs within the constructed graph by applying a probabilistic kill chain model, the identified attack subgraphs being subgraphs of the constructed graph, a kill chain comprising steps an attack uses to access a target;
   determining a score for each of the identified attack subgraphs, the score being a combination of scores for weighted activities and associated with a measure of a number of steps from the each subgraph to a particular activity or to a sensitive resource;
   filtering the identified possible attack subgraphs to determine a set of domain specific subgraphs;
   ranking the domain specific subgraphs based on at least one of connectivity and relevance;
   identifying one or more of the domain specific subgraphs where the determined score is above a particular threshold indicating a likelihood of an actual attack; and
   publishing the identified likely actual attack to an administrator, user, or security system.

17. The computer program product of claim 16, wherein identifying possible attack subgraphs comprises applying a Bayesian Markov chain Monte Carlo method.

18. The computer program product of claim 16, wherein the collection of data comprises a plurality of events, detections, or behaviors.

19. The computer program product of claim 16, wherein the relationships comprise one or more of shared resources, common entities, resource identities, IP addresses, geographic locations, or logical locations.

20. The computer program product of claim 16, wherein filtering the identified possible attack subgraphs comprises applying a probabilistic model to the graph and scoring a plurality of subgraphs of the graph.

* * * * *